United States Patent [19]
Conklin, Jr.

[11] 3,788,351
[45] Jan. 29, 1974

[54] VALVE REFERENCE SYSTEM FOR HIGH ACCELERATION ENVIRONMENT
[75] Inventor: Clement L. Conklin, Jr., Windermere, Fla.
[73] Assignee: The United States of America as represented by the Secretary of the Army, Washington, D.C.
[22] Filed: Nov. 21, 1972
[21] Appl. No.: 308,616

[52] U.S. Cl. ............... 137/512.1, 137/38, 137/538
[51] Int. Cl. ....................... F16k 51/00, F16k 17/06
[58] Field of Search ..... 137/38, 45, 512.1, 538, 540

[56] References Cited
UNITED STATES PATENTS
| | | | |
|---|---|---|---|
| 2,409,223 | 10/1946 | Parker | 137/45 |
| 619,391 | 2/1899 | Carlisle | 137/512.1 |
| 2,755,817 | 7/1956 | Barr | 137/540 X |
| 1,884,550 | 10/1932 | Boynton | 137/540 X |

Primary Examiner—William R. Cline
Attorney, Agent, or Firm—Lawrence A. Neureither; Leonard Flank; Charles R. Carter

[57] ABSTRACT

A valve reference mechanism for regulating a missile fluid or gas system that is subjected to high acceleration and vibration environments. The mechanism maintains the system at non-environmental performance levels by using two valves mounted in opposed relation to control the supply pressure inlet. When inertia forces are developed by environmental causes a compensating motion is developed which tends to close one valve orifice while opening the opposed valve orifice. The net effect of the compensating displacements is to keep the total passage area constant and reduce pressure change due to environmental causes.

1 Claim, 1 Drawing Figure

PATENTED JAN 29 1974 3,788,351
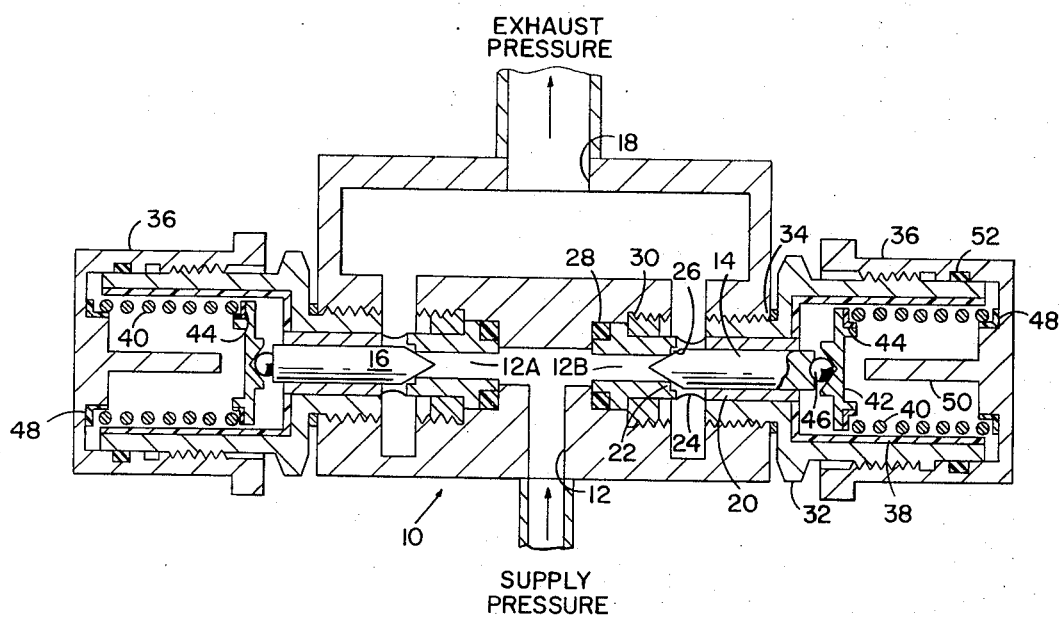

VALVE REFERENCE SYSTEM FOR HIGH ACCELERATION ENVIRONMENT

BACKGROUND OF THE INVENTION

This invention relates to the field of valve reference mechanisms. Conventional mechanisms used in fluid or gas valving incorporate a spring loaded valve. In such mechanisms pressure forces acting on the poppet valve are compared to the spring force and the net force difference controls motion of the valve. However when used in a missile involving high acceleration, the masses of the reference mechanism components (i.e. poppet and spring) become significant and can seriously degrade performance in such an environment.

SUMMARY OF THE INVENTION

The present invention has overcome the effects of high acceleration on the masses of the reference mechanism components by using two reference poppet valves which reduces the effective mass of the moving parts and hence acceleration forces. These valves are arranged in an opposed manner, such that when subjected to high acceleration environments the inertia forces are in opposite directions relative to the poppet-seat interface. Hence, one valve tends to open and the other to close, the total effect being to provide compensating displacements tending to keep the total passage area constant and reducing pressure change due to acceleration environment.

This invention may be better understood from the following detailed description taken in conjunction with the accompanying drawing.

BRIEF DESCRIPTION OF THE DRAWING

The single FIGURE shown is a sectional view of the valve reference mechanism.

DESCRIPTION OF THE PREFERRED EMBODIMENT

Reference numeral 1 identifies a manifold that contains the operating elements of the mechanism. Supply gas, to be regulated, is introduced through inlet 12 to branches 12a and 12b that are controlled by poppet valves 14 and 16. Branches 12a and 12b comprise the total passage area to be controlled. Since both valves are identical in construction only a detailed description of valve 14 will be given. Any excess gas pressure developed in the fluid or gas system will be ported through an exhaust pressure outlet 18. A valve seat 20 is provided with a sharp-edged primary orifice 22 for controlling incoming supply pressure and a plurality of secondary orifices 24 for controlling flow from orifice 22. The location of orifice 22 and orifice 24 provides an intermediate pressure between the supply pressure and the exhaust pressure in a cavity 26. This intermediate pressure provides an additional opening force on the poppet valve 14 and improves pressure regulation. A high pressure seal 28 is held in place by seat 20 which is held in the manifold by a threaded ring 30. Reference numeral 32 shows a valve housing that is threadably connected at its inner end to the manifold and sealed by a seal 34. The outer end of the valve housing contains external threads to engage a cap 36. Valve housing 32 is insulated for thermal protection by an insulating sleeve 38. Disposed within the valve housing outer end is a spring 40 that has one end engaging cap 36 and an opposite end exerting a force on a seat 42 which supports a thermal insulator 44. The force exerted by the spring on the seat is transferred to the poppet valve by a ball 46 which reduces the side loading and friction forces on the poppet valve. Cap 36 contains a thermal insulator 48 and a center extension 50 that provides a stop for the poppet in the event of pressure surges beyond normal operational limits. The cap is sealed by an O-ring seal 52. The threaded connection between the cap and valve housing provides longitudinal adjustment of the cap to vary the force exerted by the spring 40. Valves 14 and 16 are mounted in manifold 10 in an opposing manner so when subjected to an acceleration and vibration environment the inertial forces developed are in opposite directions relative to the poppet seat interface.

In operation supply pressure, acting on the face of the poppet valves, is regulated by the poppet variable orifice area, i.e., the area is automatically adjusted so that the supply pressure is maintained relatively constant in the presence of a variable supply flow rate. The orifice area developed is established by the supply pressure acting on the poppet area, plus the intermediate pressure acting on the poppet in cavity 26 to balance the force supplied by spring 40. The inertia forces, when developed by acceleration or vibration, provide a compensating motion which tend to close one poppet orifice (resulting in a higher than desired pressure levels) and tend to open the opposed poppet orifice (resulting in a decreased pressure). The net effect being to maintain relatively constant pressure control even in high acceleration and vibration environments.

I claim:

1. A valve reference mechanism for regulating the supply pressure in a missile fluid system that is subjected to inertial forces caused by acceleration and vibration environment, said mechanism comprising: a manifold including a supply pressure inlet, an exhaust pressure outlet and a pair of passages connecting said inlet and outlet; a pair of valves mounted in said manifold to control pressure flow through said passages, each valve comprising an aligned housing including a valve seat for carrying said valve, a cap engaging said housing and provided with an internally projecting center extension, a seat having a ball for engaging said valve, and a spring located between said cap and said seat to exert a force on said valve; said valve housing, said cap and said second seat being provided with insulating material for thermal protection, said valves being disposed in said manifold in an opposed relationship to provide compensating displacement of said valves whereby one valve tends to open as the other closes in response to inertial forces developed by environmental changes.

* * * * *